US006955392B2

(12) United States Patent
Dry

(10) Patent No.: US 6,955,392 B2
(45) Date of Patent: Oct. 18, 2005

(54) SELF SEALING HEAT STAKE ON AN OVERMOLDED PANEL

(75) Inventor: Alan G. Dry, Grosse Pointe, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/708,633

(22) Filed: Mar. 16, 2004

(65) Prior Publication Data

US 2005/0206192 A1    Sep. 22, 2005

(51) Int. Cl.$^7$ ................................................ B60J 5/00
(52) U.S. Cl. .................................. 296/146.7; 296/191
(58) Field of Search ............................ 296/191, 146.7, 296/146.1

(56) References Cited

U.S. PATENT DOCUMENTS

| | | | | |
|---|---|---|---|---|
| 5,667,868 | A * | 9/1997 | Freeman ..................... | 296/191 |
| 6,183,038 | B1 * | 2/2001 | Hansen et al. ............ | 296/146.7 |
| 6,237,935 | B1 * | 5/2001 | Gray et al. ............... | 280/728.3 |
| 6,321,495 | B1 * | 11/2001 | Oami ........................ | 296/191 |
| 6,422,640 | B2 * | 7/2002 | Whitehead et al. ...... | 296/146.7 |
| 6,755,997 | B2 * | 6/2004 | Gebreselassie et al. .... | 264/40.1 |
| 2002/0053750 | A1 * | 5/2002 | Schwaighofer ............ | 264/46.4 |
| 2003/0116993 | A1 * | 6/2003 | Skarb et al. .............. | 296/146.7 |
| 2003/0165664 | A1 * | 9/2003 | Carroll et al. ............. | 428/138 |
| 2004/0056382 | A1 * | 3/2004 | Shaner et al. ............. | 264/255 |
| 2004/0135394 | A1 * | 7/2004 | Clauson .................... | 296/146.7 |
| 2004/0169396 | A1 * | 9/2004 | Dooley et al. ............ | 296/146.7 |

* cited by examiner

Primary Examiner—Jason Morrow
(74) Attorney, Agent, or Firm—Earl LaFontaine

(57) ABSTRACT

An automotive door panel assembly is provided, comprising a door trim panel. The door trim panel is comprised of an outer trim panel surface; an inner trim panel surface; and at least one tubular stake. The tubular stake includes outer tubular walls protruding from the inner trim panel surface. The tubular stake including a seal sleeve flow channel connecting the outer trim panel surface to the inner trim panel surface. The panel assembly includes an overmold material applied to the outer trim panel surface. The overmold material fills the seal sleeve flow channel and generates an overmold seal sleeve skin on the outer tubular walls. A door main panel assembly is included having at least one clip hole. The tubular stake is positioned within the at least one clip hole. The overmold seal sleeve skin removably engages the at least one clip hole to form a primary seal between the door trim panel and the door main panel assembly.

20 Claims, 2 Drawing Sheets

SELF SEALING HEAT STAKE ON AN OVERMOLDED PANEL

BACKGROUND OF INVENTION

The present invention relates generally to an overmolded staked panel assembly and more particularly to a flow-through stake element allowing overmold material to flow from through the stake element to form a self sealing heat stake.

Automotive components play an important role in automobile design and functionality. Components such as vehicle doors provide controls for a wide variety of electrically based functions within the automobile. In addition, comfort and styling as increased the number of modular panels utilized in assembling vehicle doors. As such, present automotive door construction has increased in complexity. The complexity is further increased by the requirement of accessibility of many of the electrical components throughout the lifecycle of the vehicle. Replacement or repair may be required during the vehicle lifecycle, which in turn often requires the modular panels to be removable.

Complexity of design is intertwined with complexity of function within these assemblies. Continuous proper functioning of the vehicle door and installed components requires these components to operate after exposure of the vehicle door to weather conditions such as rain or snow. The solution has been the development of wet modular trim panels. These panels provide a water seal between all the sub components and the main door trim panel. Manufacturing and assembly of such assemblies can be time consuming and costly. Present manufacturing techniques often utilize heat stake technology wherein the use of resilient seals placed on heat stakes and subsequently heat staked into place. These panels are then used to snap-fit onto the main door trim panel. Manufacturing of such trim pieces can result in unduly complicated processes. Furthermore, the removal of such trim pieces from the main door trim panel can be difficult.

It would be desirable, therefore, to have a modular trim door panel assembly with improved manufacturing and assembly characteristics. It would additionally, be highly desirable to have a modular trim door panel assembly having easily removed trim panels with improved water penetration resistance.

SUMMARY OF INVENTION

It is therefore an object of the present invention to provide an automotive door panel assembly with improved manufacturing and assembly characteristics. It is a further object of the present invention to provide an automotive door panel assembly with improved removability of sealed trim panels.

In accordance with the objects of the present invention an automotive door panel assembly is provided. An automotive door panel assembly is provided, comprising a door trim panel. The door trim panel is comprised of an outer trim panel surface; an inner trim panel surface; and at least one tubular stake. The tubular stake includes outer tubular walls protruding from the inner trim panel surface. The tubular stake including a seal sleeve flow channel connecting the outer trim panel surface to the inner trim panel surface. The panel assembly includes an overmold material applied to the outer trim panel surface. The overmold material fills the seal sleeve flow channel and generates an overmold seal sleeve skin on the outer tubular walls. A door main panel assembly is included having at least one clip hole. The tubular stake is positioned within the at least one clip hole. The overmold seal sleeve skin removably engages the at least one clip hole to form a primary seal between the door trim panel and the door main panel assembly.

Other objects and features of the present invention will become apparent when viewed in light of the detailed description and preferred embodiment when taken in conjunction with the attached drawings and claims.

DETAILED DESCRIPTION

Figure 1:
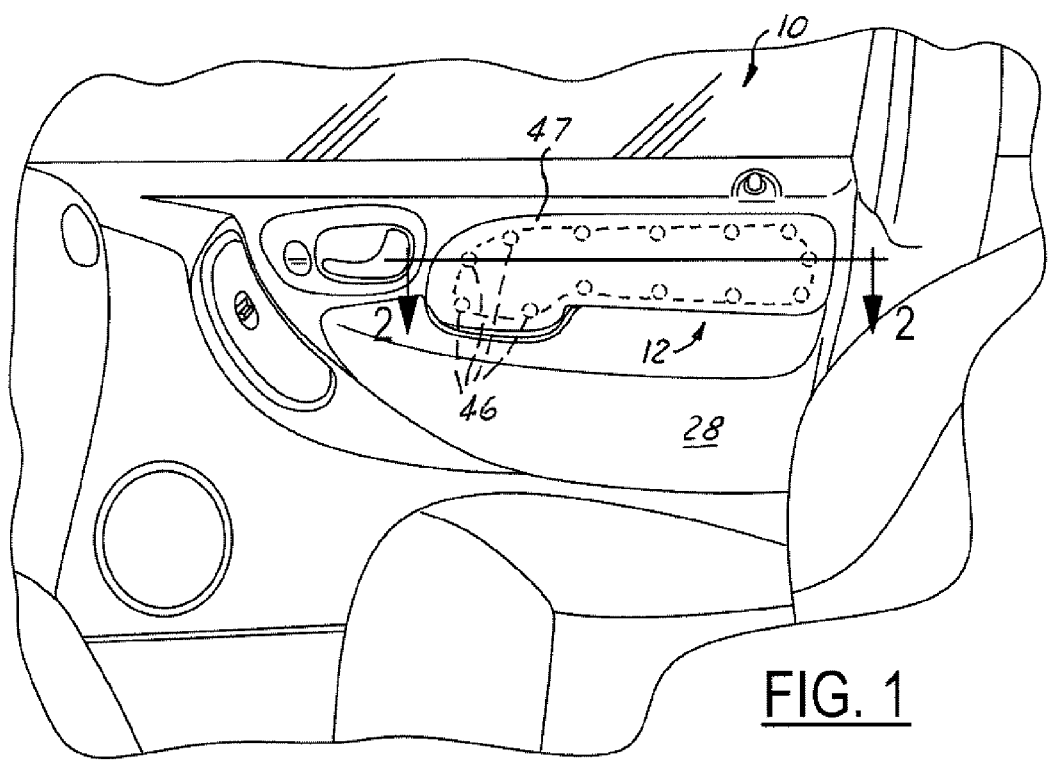
FIG. 1 is an illustration of an automotive door panel assembly in accordance with the present invention.

Referring now to FIG. 1, which is an illustration of an automotive door panel assembly 10 in accordance with the present invention. The automotive door panel assembly 10 is illustrated in a specific embodiment, however, alternate embodiments are contemplated including additional automotive trim panel components including non-door components. The automotive door panel assembly 10 includes at least one door trim panel 12. Door trim panels 12 are utilized in automotive door panel assemblies 10 and are known to come in a vast array of sizes and shapes. The door trim panel 12 proposed by the present invention provides a unique and productive structure and method for mounting the door trim panel 12 to a door main panel assembly 28.

Figure 2:
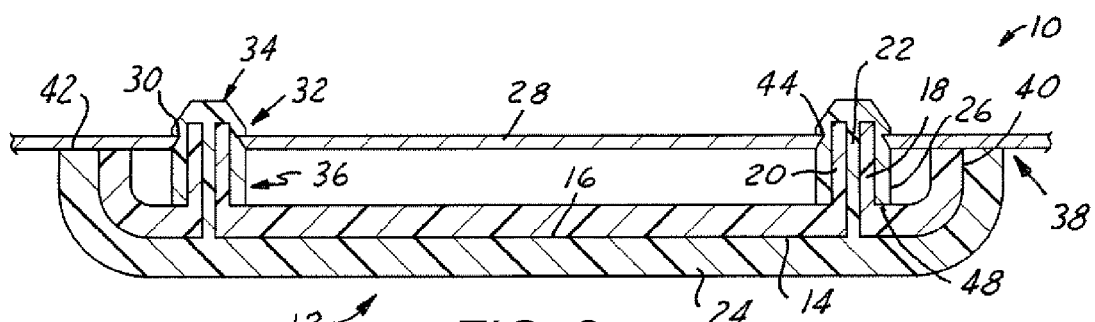
FIG. 2 is a cross-section of the automotive door panel assembly illustrated in FIG. 1, the cross-section taken along the lines 2—2 in the direction of the arrows.

The unique door trim panel 12 includes an outer trim panel surface 14 and an inner trim panel surface 16 (see FIG. 2). Although the door trim panel 12 may be formed from a variety of materials, one embodiment contemplates the use of injection molded polymers. The door trim panel 12 includes at least one tubular stake 18 protruding from the inner trim panel surface 16. Although a single tubular stake 18 may be practical for smaller door trim panels 12, it is contemplated that the trim panel 12 may be comprised of a plurality of tubular stakes 46 positioned around a mounting perimeter region 47 of the trim panel 12. Each of the tubular stakes 18 includes outer tubular walls 20 protruding from the inner trim panel surface 16. These outer tubular walls 20 generate a seal sleeve flow channel 22 which connects the outer trim panel surface 14 to the inner trim panel surface 16.

Figure 3:
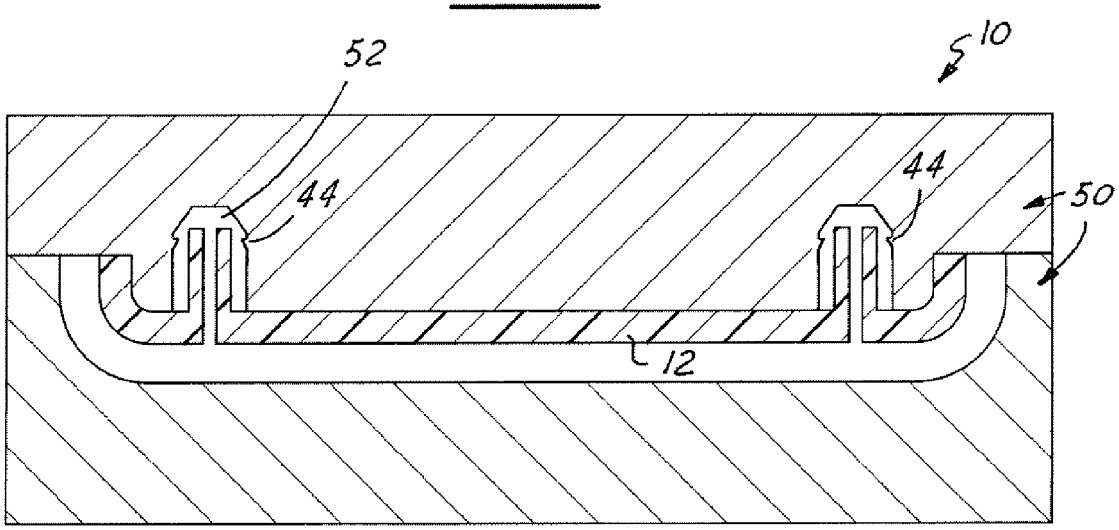
FIG. 3 is an illustration of a method of forming a door trim panel for use in the automotive door panel assembly illustrated in FIG. 1, the door trim panel illustrated positioned within an overmolding assembly.
Figure 4:
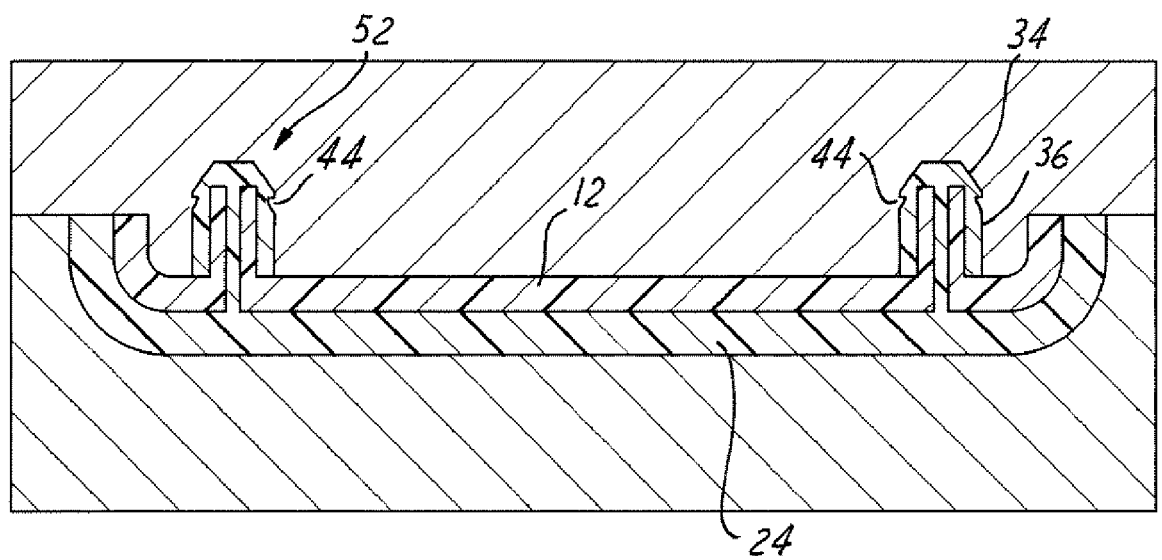
FIG. 4 is an illustration of the door trim panel and overmolding assembly illustrated in FIG. 3, the illustration showing the injection of overmolding material.

In this fashion, the door trim panel 12 can be placed within an overmolding assembly 50 as illustrated in FIG. 3. An overmold material 24, preferably a soft flexible material, can then be injected into the overmolding assembly such that the overmold material 24 is applied to the outer trim panel surface 14 (see FIG. 4). The seal sleeve flow channel 22 allows the overmold material 24 to flow from the outer trim panel surface 14 into a sleeve generating pocket 52 formed in the overmolding assembly 50 surrounding the tubular stake 46. This allows the overmold material 24 to generate an overmold seal sleeve skin 26 on the outer tubular walls 20. This methodology allows the overmolded door trim panel 12 and the overmold sleeve skin 26 to be formed using a single shot in injection molded overmold material 24. In additional, this methodology allows for the use of resilient overmolding material to form a compact, high quality seal that is bonded to the door trim panel 12. The predictable and consistent geometric form created by this processes provides substantial benefit to assembly and disassembly of the automotive door panel assembly 10.

After the overmolding process has been utilized to form the overmold sleeve skin 26, the door trim panel 12 can be assembled into the door main panel assembly 28 by inserting the tubular stake 18 into a corresponding clip hole 30 formed in the main panel assembly 28. The overmold seal sleeve skin 26 thereby engages the clip hole 30 in order to form a primary seal 32 between the door trim panel 12 and the door main panel assembly 28. Although the overmold seal sleeve skin 26 can be formed in a variety of configurations, it is contemplated that it can be formed with a chamfered guide top 34 and a seal sleeve wall 36 that secures to the outer tubular walls 20. The seal sleeve skin 26 preferably comprises a skin end 48 in contact with the inner trim panel surface 16. This configuration allows for a low effort insertion into the clip hole(s) 30 while generating a tubular sleeve that is placed in radial compression within the clip hole 30 so as to generate the primary seal 32. It is further contemplated that an engagement notch 44 may be formed in the seal sleeve skin 26 during the overmolding process. The engagement notch 44 can be utilized in order to generate a resistance effort from removing the tubular stake 18 from the clip hole 30 so as to prevent unwanted separation of the trim panels or seals. It should be understood that the seal sleeve skin 26 can be formed in a variety of configurations that provide the desired qualities of improved sealing of the clip hole 30 in combination of removability of the tubular stake 18 from the clip hole 30 for maintenance or replacement.

It is further contemplated that the overmold material 24 may be utilized to form an outer overmold seal 38 formed on an edge surface 40 of the outer trim panel surface 14. The outer overmold seal 38 can be utilized to engage the door main panel assembly 28 during installation such that a secondary sealing surface 42 is generated between the door trim panel 12 and the door main panel assembly 28. This provides a dual sealing system when used in conjunction with the primary seal 32 generated within the clip holes 32. This dual sealing system is further benefited by its simplicity of manufacturing and assembly by requiring only a single shot of overmolding material 24 to generate both seals.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

I claim:

1. An automotive door panel assembly comprising:
    a door trim panel comprising:
    an outer trim panel surface;
    an inner trim panel surface; and
    at least one tubular stake including outer tubular walls protruding from said inner trim panel surface, said tubular stake including a seal sleeve flow channel connecting said outer trim panel surface to said inner trim panel surface;
    an overmold material applied to said outer trim panel surface, said overmold material filling said seal sleeve flow channel and generating an overmold seal sleeve skin on said outer tubular walls;
    a door main panel assembly including at least one clip hole, said tubular stake positioned within said at least one clip hole; and
    wherein said overmold seal sleeve skin removably engages said at least one clip hole to form a primary seal between said door trim panel and said door main panel assembly.

2. An automotive door panel assembly as described in claim 1, wherein said overmold seal sleeve skin comprises:
    a chamfered guide top; and
    a seal sleeve wall secured to said outer tubular walls.

3. An automotive door panel assembly as described in claim 1, further comprising:
    an outer overmold seal formed on an edge surface of said outer trim panel surface, said outer overmold seal engaging said door main panel assembly to form a secondary sealing surface between said door trim panel and said door main panel assembly.

4. An automotive door panel assembly as described in claim 1, wherein said overmold seal sleeve skin further comprises.
    an engagement notch feature formed in a seal sleeve wall, said engagement notch feature engaging said at least one clip hole when said tubular stake is positioned within said at least one clip hole.

5. An automotive door panel assembly as described in claim 1, wherein said trim panel comprises:
    a plurality of said tubular stakes positioned around a perimeter mounting region of said door trim panel.

6. An automotive door panel assembly as described in claim 1, wherein said seal sleeve skin comprises a tubular sleeve in radial compression within said clip hole.

7. An automotive door panel assembly as described in claim 1, wherein said seal sleeve skin comprises a skin end in contact with said inner trim panel surface.

8. A weather resistant panel assembly comprising:
    a trim panel comprising:
    an outer trim panel surface;
    an inner trim panel surface; and
    at least one tubular stake including a seal sleeve flow channel connecting said outer trim panel surface to said inner trim panel surface;
    an overmold material applied to said outer trim panel surface, said overmold material filling said seal sleeve flow channel and generating an overmold seal sleeve skin;
    a main panel assembly including at least one clip hole, said overmold seal sleeve skin positioned within said at least one clip hole; and
    wherein said overmold seal sleeve skin removably engages said at least one clip hole to form a primary seal between said trim panel and said main panel assembly.

9. A weather resistant panel assembly as described in claim 8, wherein said overmold seal sleeve skin comprises:
    a chamfered guide top; and
    a seal sleeve wall secured to said outer tubular walls.

10. A weather resistant panel assembly as described in claim 8, further comprising:
    an outer overmold seal formed on an edge surface of said outer trim panel surface, said outer overmold seal engaging said main panel assembly to form a secondary sealing surface between said trim panel and said main panel assembly.

11. A weather resistant panel assembly as described in claim 8, wherein said overmold seal sleeve skin further comprises;
   an engagement notch feature formed in a seal sleeve wall, said engagement notch feature engaging said at least one clip hole when said tubular stake is positioned within said at least one clip hole.

12. A weather resistant panel assembly as described in claim 8, wherein said trim panel comprises:
   a plurality of said tubular stakes positioned around a perimeter mounting region of said trim panel.

13. A weather resistant panel assembly as described in claim 8, wherein said seal sleeve skin comprises a tubular sleeve in radial compression within said clip hole.

14. A weather resistant panel assembly as described in claim 8, wherein said seal sleeve skin comprises a skin end in contact with said inner trim panel surface.

15. A method of manufacturing a moisture resistant panel assembly comprising:
   forming a trim panel comprising: an outer trim panel surface; an trim panel inner surface; and a tubular stake including outer tubular walls protruding from said inner trim panel surface; said tubular stake including a seal sleeve flow channel connecting said outer trim panel surface to said inner trim panel surface;
   placing said trim panel in an overmolding assembly;
   injecting an overmold material such that:
   said overmold material flows onto said outer surface to form an outer overmold skin;
   said overmold material flows through said seal sleeve flow channel from said outer trim panel surface towards said inner trim panel surface; and
   said overmold material flows over said tubular stake to form an overmold sleeve skin on said outer tubular walls.

16. A method of manufacturing a moisture resistant panel assembly as described in claim 15, further comprising:
   installing said trim panel into a main panel assembly such that said tubular stake is positioned within at least one clip hole formed in said main panel assembly; and
   generating a seal between said trim panel and said main panel assembly by way of said overmold sleeve skin removably engaging said at least one clip hole.

17. A method of manufacturing a moisture resistant panel assembly as described in claim 15, further comprising:
   forming an engagement feature in said overmold sleeve skin such that said overmold sleeve skin lockingly engages said at least one clip hole.

18. A method of manufacturing a moisture resistant panel assembly as described in claim 15, further comprising:
   flowing said overmold material on said outer trim panel surface into contact with an edge surface of said outer trim panel surface to form an outer overmold seal, said outer overmold seal engaging said main panel assembly to form a secondary sealing surface between said trim panel and said main panel assembly.

19. A method of manufacturing a moisture resistant panel assembly as described in claim 18, further comprising:
   installing said trim panel into a main panel assembly such that said tubular stake is positioned within at least one clip hole formed in said main panel assembly; and
   generating a seal between said trim panel and said main panel assembly by way of said overmold sleeve skin removably engaging said at least one clip hole;
   generating a secondary seal between said trim panel and said main panel assembly by forcing said outer overmold seal into engagement with said main panel assembly.

20. A manufacturing a moisture resistant panel assembly as described in claim 16, wherein said overmold sleeve skin is placed in radial compression to seal said at least one clip hole.

* * * * *